United States Patent
Kling et al.

(10) Patent No.: US 11,429,718 B2
(45) Date of Patent: Aug. 30, 2022

(54) INDUSTRIAL SYSTEM EVENT DETECTION AND CORRESPONDING RESPONSE

(71) Applicant: Schneider Electric Systems USA, Inc., Foxborough, MA (US)

(72) Inventors: Andrew Kling, Andover, MA (US); Zakarya Drias, Andover, MA (US)

(73) Assignee: Schneider Electric Systems USA, Inc., Foxborough, MA (US)

( * ) Notice: Subject to any disclaimer, the term of this patent is extended or adjusted under 35 U.S.C. 154(b) by 297 days.

(21) Appl. No.: 16/574,005

(22) Filed: Sep. 17, 2019

(65) Prior Publication Data

US 2020/0089885 A1    Mar. 19, 2020

Related U.S. Application Data

(60) Provisional application No. 62/732,394, filed on Sep. 17, 2018.

(51) Int. Cl.
| | |
|---|---|
| *G06F 21/56* | (2013.01) |
| *G06N 5/04* | (2006.01) |
| *G06F 21/55* | (2013.01) |
| *G06N 20/00* | (2019.01) |
| *G05B 19/418* | (2006.01) |

(52) U.S. Cl.
CPC .......... *G06F 21/566* (2013.01); *G06F 21/554* (2013.01); *G06N 5/047* (2013.01); *G06N 20/00* (2019.01); *G05B 19/4184* (2013.01); *G06F 2221/034* (2013.01)

(58) Field of Classification Search
CPC ....... G06F 21/50–568; G06F 2221/034; G06F 5/047; G06N 20/00; G05B 19/418–41895
See application file for complete search history.

(56) References Cited

U.S. PATENT DOCUMENTS

| | | | |
|---|---|---|---|
| 10,078,317 B2 * | 9/2018 | Houmb | G05B 19/406 |
| 2016/0330225 A1 * | 11/2016 | Kroyzer | G06F 21/552 |

(Continued)

OTHER PUBLICATIONS

Kravchik M, Shabtai A. Detecting cyberattacks in industrial control systems using convolutional neural networks. InProceedings of the 2018 Workshop on Cyber-Physical Systems Security and Privacy Jan. 15, 2018 (pp. 72-83). (Year: 2018).*

(Continued)

*Primary Examiner* — Madhuri R Herzog
(74) *Attorney, Agent, or Firm* — Locke Lord LLP

(57) ABSTRACT

Systems and methods of providing industrial system cybersecurity event detection and corresponding response are described. The systems and methods utilize various end point sensors already available in an industrial control system and an associated monitoring process to detect cybersecurity and other security threats based on data collected by the sensors. The cybersecurity monitoring process may be trained with sensor data patterns and behaviors for known threats to recognize potentially malicious activity. Such a process may also learn to recognize and be trained on new threats and may incorporate each new threat to stay current with evolving industrial threats. This allows an enterprise to utilize its existing industrial infrastructure to detect and act upon a variety of threats to an industrial system with little or no interference or interruption of existing industrial processes.

18 Claims, 6 Drawing Sheets

(56) References Cited

U.S. PATENT DOCUMENTS

2017/0264629 A1  9/2017  Wei et al.
2018/0157838 A1  6/2018  Bushey et al.

OTHER PUBLICATIONS

Potluri S, Diedrich C, Sangala GK. Identifying false data injection attacks in industrial control systems using artificial neural networks . In2017 22nd IEEE International Conference on Emerging Technologies and Factory Automation (ETFA) Sep. 12, 2017 (pp. 1-8). IEEE. (Year: 2017).*
International Search Report and Written Opinion for PCT Application No. PCT/US2019/051597 dated Nov. 29, 2019, 10 pages.

* cited by examiner

INDUSTRIAL SYSTEM EVENT DETECTION AND CORRESPONDING RESPONSE

CROSS-REFERENCE TO RELATED APPLICATIONS

This application for patent claims the benefit of priority to and incorporates herein by reference U.S. Provisional Application No. 62/732,394, entitled "Systems and Methods of Industrial System Event Detection and Corresponding Response," filed Sep. 17, 2018.

TECHNICAL FIELD

At least one embodiment in accordance with the present disclosure relates generally to systems and methods for providing industrial system cybersecurity event detection, and more specifically, to systems and methods of providing industrial system cybersecurity event detection and corresponding response.

BACKGROUND

Present process control systems evolved out of the pneumatic and electronic analog control systems that preceded them. These early control systems were designed to provide process control functions for a control loop or a number of related control loops of a production process in an autonomous, but coordinated manner, with the coordination often being achieved through the appropriate settings of set points across the multiple controllers. As such the architecture of early control systems was aligned to the process flow of the production process, with each control typically limited to the control of a small portion or component of the overall production flow of the operation. As a result, each process controller could be reasonably applied to the portion or component of the operation it was responsible to control, but was otherwise limited.

Thus, while a number of advances have been made in the field of industrial systems and process control, it will be readily appreciated that improvements are continually needed.

SUMMARY

Systems and methods of providing industrial system cybersecurity event detection and corresponding response are described. The system and method utilize various end point sensors already available in an industrial control system and an associated monitoring process to detect cybersecurity and other security threats based on data collected by the sensors. The cybersecurity monitoring process may be trained with sensor data patterns and behaviors for known threats to recognize potentially malicious activity. Such a process may also learn to recognize and be trained on new threats and may incorporate each new threat to stay current with evolving industrial threats. This allows an enterprise to utilize its existing industrial infrastructure to detect and act upon a variety of threats to an industrial system with little or no interference or interruption of existing industrial processes.

In general, in one aspect, the present disclosure relates a method of providing industrial system cybersecurity event detection and corresponding response. The method comprises, among other things, receiving sensor outputs from one or more industrial sensors in the industrial system, the industrial sensors being used to monitor and control an industrial process in the industrial system, and deriving sensor data from the sensor outputs, the sensor data reflecting one or more industrial processing aspects of the industrial process. The method also comprises processing the sensor data using one or more pattern recognition algorithms, the one or more pattern recognition algorithms trained to recognize potentially suspicious/malicious patterns that indicate a potential cyberattack on the industrial system. The method further comprises determining whether the one or more pattern recognition algorithms recognize the sensor data as a potentially suspicious/malicious pattern; and executing a malicious pattern response process in response to the sensor data being recognized as a potentially suspicious/malicious pattern.

In accordance with any one or more of the foregoing embodiments, the malicious pattern response process includes one or more process control actions, the one or more control actions defined on a per pattern basis, a set of patterns basis, or for all patterns, and/or the one or more process control actions include doing nothing, notifying a set of users, monitoring one or more aspects of the industrial process for further changes, halting portions of the one or more aspects of the industrial process, or halting the industrial process.

In accordance with any one or more of the foregoing embodiments, the method further comprises storing the sensor data in a pattern recognition repository in response to the sensor data being recognized as a potentially suspicious/malicious pattern, and/or executing a remediation response process in response to the sensor data not being recognized as a potentially suspicious/malicious pattern.

In accordance with any one or more of the foregoing embodiments, the one or more pattern recognition algorithms are machine learning algorithms, the machine learning algorithms are trained by injecting one or more training patterns into the industrial system at predefined points in the industrial system, and/or the one or more training patterns injected into the industrial system are stored in a library of training patterns.

In accordance with any one or more of the foregoing embodiments, processing the sensor data is performed in a cloud computing environment or locally at the industrial system, and/or the one or more industrial sensors include one or more of analog sensors and digital sensors.

In general, in another aspect, the present disclosure relates to a system for providing industrial system cybersecurity event detection and corresponding response. The system comprises, among other things, a local or virtual processor and a storage device communicatively coupled to the local or virtual processor, the storage device storing computer-readable instructions for a cybersecurity process thereon that. When executed by the processor, the computer-readable instructions cause the system to receive sensor outputs from one or more industrial sensors in the industrial system, the industrial sensors being used to monitor and control an industrial process in the industrial system, and derive sensor data from the sensor outputs, the sensor data reflecting one or more industrial processing aspects of the industrial process. The computer-readable instructions also cause the processor to process the sensor data using one or more pattern recognition algorithms, the one or more pattern recognition algorithms trained to recognize potentially suspicious/malicious patterns that indicate a potential cyberattack on the industrial system. The computer-readable instructions further cause the processor to determine whether the one or more pattern recognition algorithms recognize the sensor data as a potentially suspicious/malicious pattern, and execute a malicious pattern response process in response to the sensor data being recognized as a potentially suspicious/malicious pattern.

In accordance with any one or more of the foregoing embodiments, the malicious pattern response process includes one or more process control actions, the one or more control actions defined on a per pattern basis, a set of patterns basis, or for all patterns, and/or the one or more process control actions include doing nothing, notifying a set of users, monitoring one or more aspects of the industrial process for further changes, halting portions of the one or more aspects of the industrial process, or halting the industrial process.

In accordance with any one or more of the foregoing embodiments, the computer-readable instructions further cause the system to store the sensor data in a pattern recognition repository in response to the sensor data being recognized as a potentially suspicious/malicious pattern, and/or cause the system to execute a remediation response process in response to the sensor data not being recognized as a potentially suspicious/malicious pattern.

In accordance with any one or more of the foregoing embodiments, the one or more pattern recognition algorithms are machine learning algorithms, the machine learning algorithms are trained by injecting one or more training patterns into the industrial system at predefined points in the industrial system, and/or the one or more training patterns injected into the industrial system are stored in a library of training patterns.

In accordance with any one or more of the foregoing embodiments, the one or more industrial sensors include one or more of analog sensors and digital sensors.

In general, in yet another aspect, the present disclosure relates to a non-transitory computer-readable medium storing computer-readable instruction for a cybersecurity process thereon. When executed by a processor, the cybersecurity process causes the processor to receive sensor outputs from one or more industrial sensors in the industrial system, the industrial sensors being used to monitor and control an industrial process in the industrial system, and derive sensor data from the sensor outputs, the sensor data reflecting one or more industrial processing aspects of the industrial process. The cybersecurity process also causes the processor to process the sensor data using one or more pattern recognition algorithms, the one or more pattern recognition algorithms trained to recognize potentially suspicious/malicious patterns that indicate a potential cyberattack on the industrial system. The cybersecurity process further causes the processor to determine whether the one or more pattern recognition algorithms recognize the sensor data as a potentially suspicious/malicious pattern, and execute a malicious pattern response process in response to the sensor data being recognized as a potentially suspicious/malicious pattern.

BRIEF DESCRIPTION OF THE DRAWINGS

These accompanying drawings are not intended to be drawn to scale. In the drawings, each identical or nearly identical component that is illustrated with various figures, are represented by a line numeral. For purposes of clarity, not every component may be labeled in every drawing. In the drawings.

DETAILED DESCRIPTION

Figure 1:
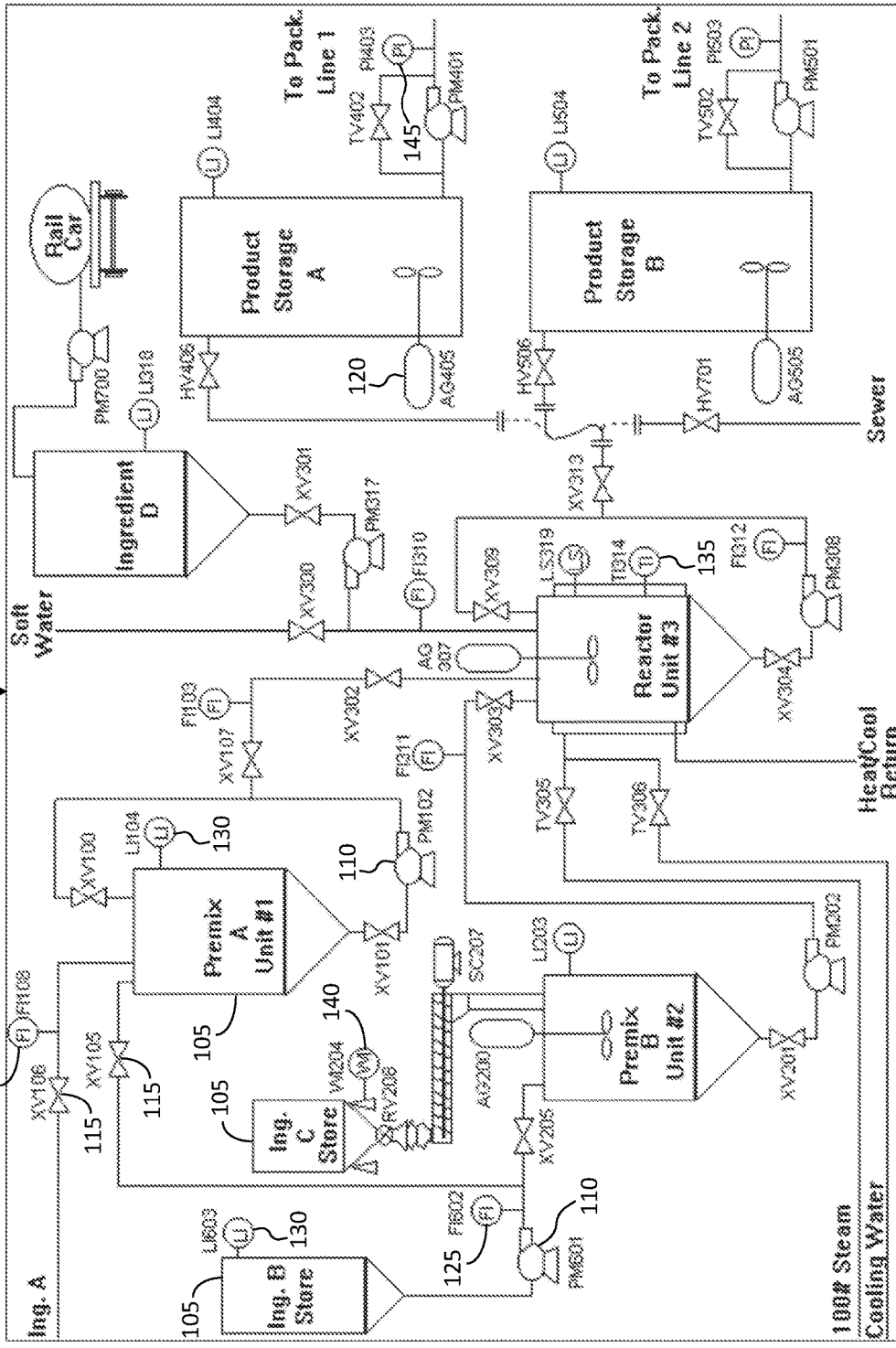
FIG. 1 illustrates an example of various equipment associated with an industrial system in accordance with various embodiments of the disclosure.

This disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for description purposes and should not be regarded as limiting. The use of "including," "comprising," "having," "containing," "involving," and variations herein, are meant to be open-ended, i.e. "including but not limited to."

With the introduction of computer technology as the delivery vehicle for process control, the potential scope of automated coordinated control increased dramatically. Such digital computer technology provides control systems that have enormous capability and flexibility in terms of automating, configuring, and scaling a process control. To make these emerging digital control systems more acceptable to existing markets, many of them are programmed to directly replicate the functionality and architecture of their analog predecessors. However, while digital control systems provide many benefits, they also have many of the cybersecurity vulnerabilities or anomalies that encumber other, non-industrial computer systems, in addition to industrial control specific vulnerabilities or anomalies.

Computer security and cybersecurity generally refers to detection and prevention of attempts to damage or disrupt a computer network or system and/or efforts to access files and infiltrate or steal data. Cybersecurity threats can come in a variety of ways, some examples of which include phishing, trojans, botnets, ransomware, distributed denial of service (DDoS), wiper attacks, and the like. More recently, cyber threats have arisen in the context of the Internet of Things (IoT) and specifically the Industrial IoT (IIoT), which is the application of IoT in the manufacturing and processing context. And these cyber threats continue to evolve, adapting to new cybersecurity measures and changing with changes in computing technology.

Cybersecurity issues in an industrial control context warrant particular considerations that cybersecurity issues for information technology settings often do not. Industrial control systems are generally composed of individual process control points or nodes connected to one another. These individual process control points or nodes do not have the necessary processing ability to detect and react to cybersecurity threats. Also, the systems that are controlled by an industrial control system often are associated with substantial critical infrastructure, such as a power grid, public water system, and the like, and diagnosing and acting upon cyber threats quickly and correctly to maintain infrastructure integrity is a significant challenge.

Embodiments of the current disclosure present a solution to this challenge by providing systems and methods that utilize the various end point sensors already available in an industrial control system and an associated monitoring process to detect cybersecurity and other security threats based on data collected by the sensors. While these end point sensors generally themselves do not have the necessary processing capability to detect such threats, a monitoring process which utilizes the end point sensors and the data they natively collect is illustrated herein that yields detection of cybersecurity and associated threats. Additionally, such a process may be pre-trained with sensor data patterns and behaviors for known threats and thus does not require a period of time to learn to recognize them before being able to detect potentially malicious activity. Such a process may also learn to recognize or be trained on new threats on-the-fly and incorporate each new threat into the cybersecurity evaluation process to stay current with evolving industrial threats. Utilizing embodiments of this disclosure, users gain the benefit of being able to utilize their existing industrial infrastructure to detect and act upon the variety of threats to an industrial system with little or no interference or interruption of existing industrial processes.

Referring now to FIG. 1, a piping and instrumentation diagram (P&ID) illustrates an example of equipment associated with an industrial system 100 in accordance with various embodiments of the disclosure. The equipment shown here for the system 100 includes many common components found in many industrial processes, such as fluid tanks 105, pumps 110, valves 115, mixers 120, and the like. Large operational domains like the industrial system 100 can present complex and challenging coordinated control issues. In most cases, the ability for a control system to obtain information to monitor and manage the system 100 or an industrial process therein are the edge (i.e., end point) sensors that provide data to the control system. Thus, a variety of end point sensors are installed at individual process points or nodes around the system 100 for purposes of monitoring various aspects of the industrial process, such as the temperatures of certain reactants, the amount of contaminants in a certain fluid, tank levels, fluid flow rates, pressures, power consumption, and other aspects. These industrial sensors are shown as circle symbols in the figure and include, for example, flow rate sensors 125 (Fx), level sensors 130 (Lx), temperature sensors 135 (Tx), weight sensors 140 (Wx), pressure sensors 145 (Px), and the like. Some or all of these sensors 125-145 may be digital sensors that output their measurements in a digital format, or some of all of these sensors may be analog sensors that output their measurements in an analog format. As mentioned above, these industrial sensors generally themselves do not have the necessary processing capability to detect cybersecurity threats. Therefore, in accordance with embodiments of this disclosure, an industrial cybersecurity architecture 150 is provided that utilizes the sensors and the data they natively collect (i.e., as part of the industrial process) to detect cybersecurity and associated threats, as shown in FIG. 2.

Figure 2:
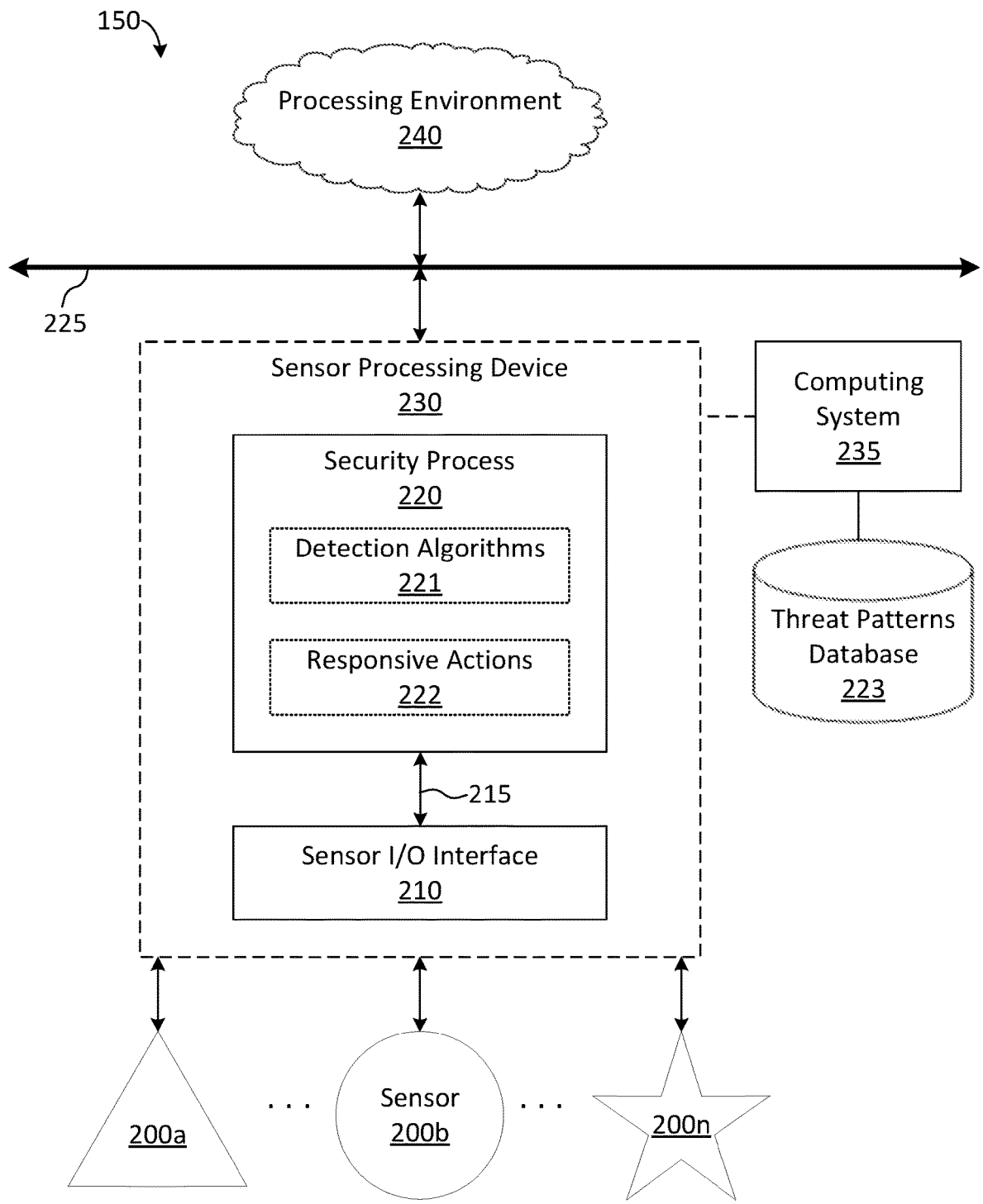
FIG. 2 illustrates an example of a block diagram of components of a system for providing industrial system cybersecurity event detection and corresponding response in accordance with various embodiments of the disclosure.

FIG. 2 illustrates an example of an industrial cybersecurity architecture 150 for an industrial system (like the system 100). The figure shows a block diagram of components for providing industrial system cybersecurity event detection and corresponding response in accordance with various embodiments of the disclosure. The term "cybersecurity event" as used herein generally refers to a cyberattack or other unauthorized access to the industrial system. The series of components and processes shown are more typical of digital based control systems that use digital sensors; however, it should be appreciated that many existing control systems have a mix of analog and digital sensors, and some control systems have only analog sensors. One benefit of this disclosure is, regardless of whether a hybrid analog/digital industrial system or an analog only industrial system is deployed, the present disclosure is equally able to be utilized to determine cybersecurity and related industrial threats.

As shown in FIG. 2, a plurality of industrial sensors 200a-n are utilized to measure various process parameters and provide data for various aspects of an industrial process associated with the industrial sensors 200a-n. The industrial sensors 200a-n may be wired or wireless (e.g., Bluetooth, Wi-Fi, etc.), and may output measurements in analog and/or digital format. Examples may include, but are not limited to, temperature, humidity, flow rate, pressure, accelerometers, Coriolis, rotary encoders, and proximity sensors. Each industrial sensor 200a-n typically has a normal operational range where the sensor is expected to operate. In preferred embodiments, the industrial sensors 200a-n already exist in the industrial system as part of an ongoing industrial process, and are being used additionally for cybersecurity purposes. This dual use of the sensors 200a-n occurs in a seamless (or nearly seamless) and noninterfering manner, with no change to the sensors 200a-n or their operation. It will of course be understood that additional sensors may be installed as needed expressly for the purposes of the industrial cybersecurity architecture 150, within the scope of the present disclosure.

The industrial cybersecurity architecture 150 also leverages at least one sensor I/O interface 210 that serves to receive and process measurements from the industrial sensors 200a-n. Such sensor I/O interfaces 210 are well known aggregation components that operate to collect and conform measurements from the sensors 200a-n to a certain data type and format as specified for the industrial system. Each sensor I/O interface 210 can collect and provide sensor data, such as sensor ID, measurement value, and/or date and time, and the like, to one or more subsequent processes, such as an industrial control process (not expressly shown) that monitors and controls the industrial system. Where the sensor data is in the form of analog signals, the sensor I/O interface 210 may include (or have access to) analog-to-digital conversion capability. It should be appreciated that a sensor I/O device 210 is not compulsory to the various embodiments of the present disclosure, and that the industrial sensors 200a-n may operate with or without a sensor I/O interface 210 depending on the particular implementation.

In accordance with the present disclosure, the industrial cybersecurity architecture 150 includes a cybersecurity process 220 that detects potential cybersecurity threats to the industrial system by looking at unusual sensor behavior or patterns (i.e., unexpected sensor data). The cybersecurity process 220 may receive the sensor data from the sensor I/O interface 210 in the manner mentioned above in some embodiments (e.g., over a communication path 215), or the data may be received from another source in the industrial system, or directly from the sensors 200a-n in some embodiments. The cybersecurity threats may be detected by the cybersecurity process 220 using various cybersecurity and malicious action detection and remediation techniques, such as those discussed and described with respect to FIGS. 4A and 4B. This cybersecurity process 220 may be executed serially or in parallel with any subsequent processes that use the sensor data provided via the sensor I/O interface 210, such as the industrial control process mentioned earlier. In preferred embodiments, the cybersecurity process 220 taps into the sensor data provided by the sensor I/O interface 210 in a manner that does not interfere with the sensors 200a-n, the sensor I/O interface 210, or any subsequent processes.

In some embodiments, the cybersecurity process 220 may be a process which operates concurrently with an existing sensor I/O interface 210 in a combined sensor processing device 230. In the shown embodiment, the combined sensor processing device 230 may reside or exist in a computing system 235, such as a local general-purpose computer having a CPU and computer-readable storage medium (e.g., a nonvolatile storage device). The cybersecurity process 220 may then be stored as computer-readable instructions on the computing system 235 and executed along with the sensor I/O interface 210 by the sensor processing device 230. Such an arrangement (i.e., local execution) allows the cybersecurity process 220 to detect potential cybersecurity threats in real time and take responsive action as needed.

Figure 3:
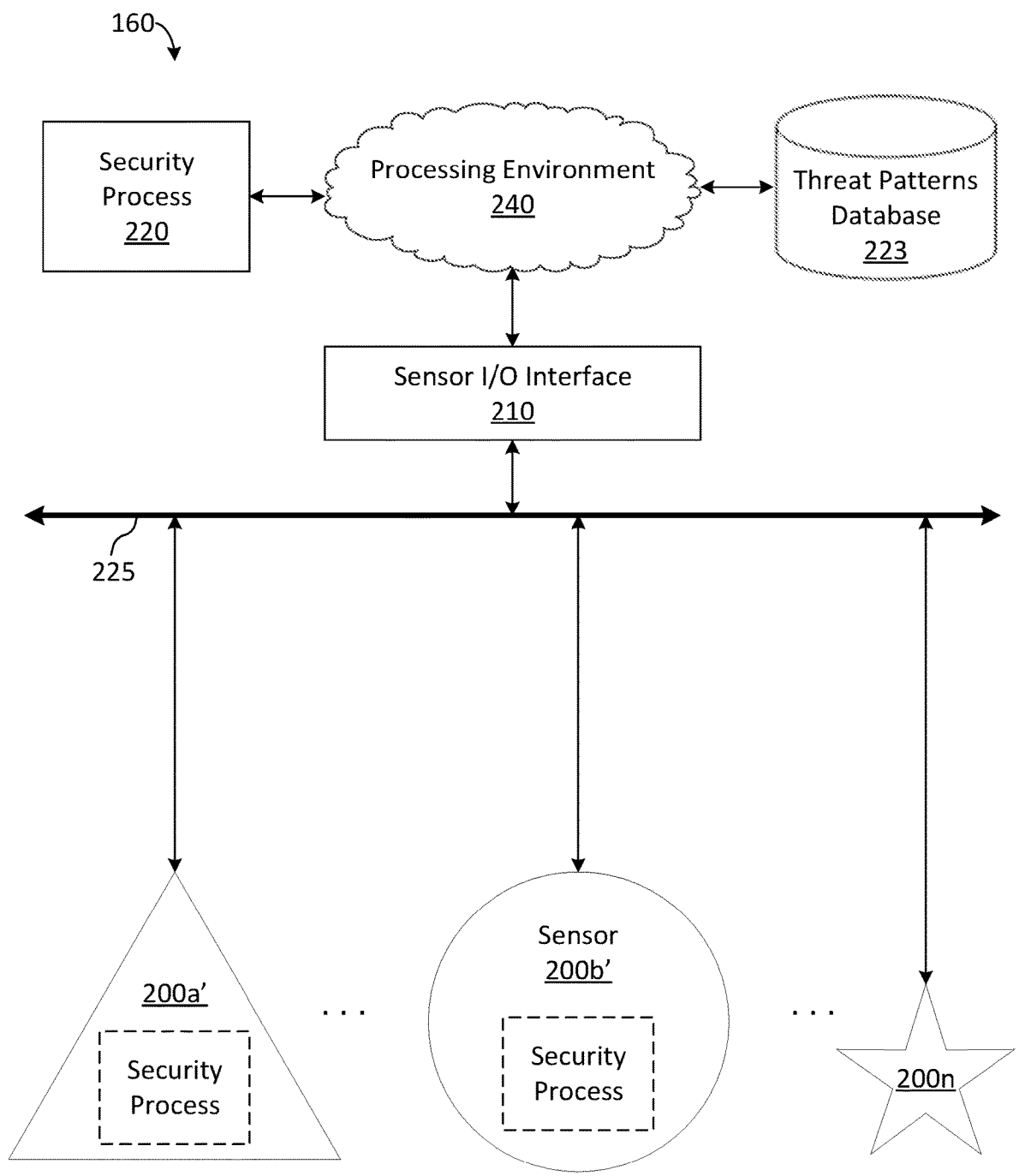
FIG. 3 illustrates an alternative example of a block diagram of components of a system for providing industrial system cybersecurity event detection and corresponding response in accordance with various embodiments of the disclosure.

It is also possible in some embodiments for the cybersecurity process 220 to be a standalone process operating on a standalone processing device that taps into the sensor I/O interface 210 to obtain sensor data. It is additionally possible for the cybersecurity process 220 to reside within the aforementioned industrial control process of the industrial system where the cybersecurity process 220 may be carried out as one of the operations of the industrial control process. It is further possible for the cybersecurity process 220 to reside in a remote processing environment 240 (i.e., a virtual processor), such as a cloud computing environment, or other decentralized computing resource (not expressly shown), such as a data center. An example of the cybersecurity process 220 residing in a remote processing environment 240 is depicted in FIG. 3.

A benefit of the above embodiments is, by hosting the cybersecurity process 220 separately from the industrial sensors 200a-n, no additional computational load is placed on the sensors 200a-n. Many existing industrial sensors 200a-n may be unable to sustain the computational loads necessary to perform cybersecurity and malicious pattern detection, for example, using the methods shown in FIGS. 4A and 4B. It should be appreciated that some individual industrial sensors 200a-n may have the capabilities to host such a cybersecurity process 220, however. Thus, it is foreseeable that a mix of cybersecurity capable sensor devices 200a', 200b' and non-cybersecurity capable sensor devices 200n which are operatively connected to a device or process 220 that is cybersecurity capable may exist given current technologies, with the cybersecurity process 220 being hosted on the cybersecurity capable devices.

Operation of the cybersecurity process 220 generally involves receiving the sensor data and inputting the data into one or more detection algorithms or models 221 that can detect or otherwise recognize potentially suspicious or malicious patterns or activity. The ability to recognize potentially suspicious/malicious patterns from sensor data, for both analog and/or digital based sensors, is particularly beneficial in an industrial context, as many of the available inputs to an industrial control process are analog or a mix of analog and digital inputs. Oftentimes a cyberattack or unauthorized intrusion can intentionally or inadvertently cause some aspects of an industrial process to fall outside normal operating parameters. Such departures can manifest in the form of unusual or abnormal sensor behavior or data.

Consider a temperature sensor having an operating range from −50 to +50 degrees Celsius that is being used for a process that operates typically from 0 to +25 degrees Celsius. A sensor reading that deviates from the sensor range may indicate a sensor malfunction, whereas a reading that deviates only from the process range may indicate a process failure. However, if the sensor reading deviates from the process range in an unusual pattern, such as repeatedly spiking beyond the process range within a short time period (e.g., 60 seconds), then this may indicate a possible cyberattack. Similarly, several different sensors exhibiting otherwise normal behavior individually may indicate a possible cyberattack when taken in combination, such as pressure and temperature sensor data decreasing at the same time and/or by the same percentage. Still other examples may include sensor data exhibiting unusual patterns at certain key nodes or points in the industrial process, and the like. The one or more detection algorithms 221 can detect whether the sensor data (which may or may not reflect a process failure) indicate such a possible cyberattack by recognizing the behavior pattern of the sensors.

Several types of detection algorithms known to those skilled in the art may be used as the one or more detection algorithms 221. In particular, classification algorithms (e.g., decision trees), clustering algorithms (e.g., hierarchical learning), Bayesian networks, and/or real value sequences (e.g., Kalman filters) may be used to recognize potentially suspicious/malicious patterns. Other pattern recognition and detection algorithms, generally known as machine learning (ML) algorithms, are also available. More than one ML algorithms may be used to identify and/or validate a particular suspicious/malicious pattern in some embodiments.

If potentially suspicious/malicious activity is detected, a responsive actions module 222 automatically initiates appropriate responsive actions (including no action) depending on the type of activity detected. The responsive action module 222 may initiate action ranging from logging the date and time of an occurrence, to sending an alert message to the industrial control process and/or appropriate personnel, to performing one or more process control actions (e.g., shutting off power to equipment to avoid a catastrophic failure), and the like. Detected potentially suspicious/malicious activity may then be stored by the responsive action module 222 as threat patterns in a threat patterns database 223. The threat patterns stored in the database 223 may then be verified and used for further training of the detection algorithms 221 and/or for detecting subsequent suspicious/malicious activity. The threat patterns may also be sent to the processing environment 240 (e.g., over an industrial communication bus 225) for storage and further processing and verification. Alert messages may likewise be sent to the processing environment 240 for further processing. In some embodiments, any suspicious/malicious activity may need to be reviewed and verified by appropriate personnel before the responsive action module 222 initiates any responsive actions. For example, it is expected that in most implementations, equipment shutdown or other process altering actions will be performed by an operator upon verification of the suspicious/malicious activity rather than by the responsive action module 222.

In the foregoing embodiments, it should be appreciated that one or more of the industrial sensors 200a-n may connect to one or more sensor I/O interfaces 210 based on the capabilities of the sensor I/O interfaces 210. It should also be appreciated that there are industrial sensors 200a-n that may not require a sensor I/O interface 210 and may communicate directly via the communication path 215 directly to the industrial communication bus 225. One or more such busses 225 may exist in an industrial control system and are generally utilized to allow multiple devices to share a common data and/or control path. An industrial communication bus 225 may be utilized to interconnect several individual sensors, aggregators, sensor I/O interfaces, and/or process control elements and allow communication between these elements.

It should be appreciated that the sensor I/O interfaces 210 and communication paths 215 are various and may include wired, wireless, or a hybrid version comprising both types of connections. Wired connection types may include, but are not limited to, any physical cabling method such as Category 5 cable, coaxial, fiber, or any other physical media to propagate electrical signals for purposes that may include providing power to a device, transmission of data, or both, such as Power Over Ethernet (POE). Wireless data connections may include, but are not limited to Personal Area Networks (PAN), Local Area Networks (LAN), Wi-Fi, Bluetooth, cellular, global, or space-based communication networks (i.e., satellites). It will be well understood that various communication paths may communicate with any type of computerized device over any type of network with addressable or direct connections.

Additional exemplary embodiments are detailed in FIG. 3 where the function of the sensor I/O interface 210 is provided at the control processing environment 240. If these embodiments are utilized, sensor data will be received in the native form provided by the sensors and transformed into a form useable by the various processes and devices upstream of the sensors. Some sensor I/O interfaces 210 may include an analog to digital converter to convert analog sensor data into digital data to be used by other processes or devices.

Referring to FIG. 3, a block diagram of components of an alternative industrial cybersecurity architecture 160 for providing industrial system cybersecurity event detection and corresponding response is shown. In this embodiment, the sensor I/O interface 210, the cybersecurity process 220, and the threat patterns database 223 are hosted in the processing environment 240, such as a cloud computing environment. The industrial sensors may then be connected directly to the industrial communication bus 225 and provide measurement data to the processing environment 240 for suspicious/malicious activity detection. In addition (or alternatively), one or more advanced industrial sensors 200a', 200b' that have sufficient processing capability to host a cybersecurity process like the cybersecurity process 220 may optionally be deployed as the sensors 200a-n. These more advanced sensors 200a', 200b' may then provide measurement data directly to the cybersecurity process running on the sensors to detect potentially suspicious/malicious activity. Detected potentially suspicious/malicious activity may be forwarded by the advanced sensors 200a-n to the processing environment 240 for storage and further processing via the industrial communication bus 225.

Where an ML algorithm is used as one of the detection algorithms, the ML algorithm should be appropriately trained before it can perform its detection function effectively. Training may be done using a supervised learning method in which data representing known suspicious/malicious patterns or activity (i.e., tag or labeled data) is applied as an input to the ML algorithm. The output of the algorithm is compared to an expected or known output, and the algorithm parameters are adjusted to reduce the error (i.e., difference between the algorithm output and a known output). This process is repeated until the error is below a predefined error threshold. Training of the ML algorithm can be performed in-system using a training mode or the training can be done elsewhere and the existing ML algorithm subsequently updated or replaced with the more recently trained algorithm. Data preparation and preprocessing form an integral part of this process, as properly processed and labeled data is needed to produce an accurate ML algorithm. As well, training is an iterative process that usually needs a significant number of input-output examples to produce good results. Once the ML algorithm is properly trained, it may be deployed as one of the detection algorithms in the cybersecurity process 220 to recognize potentially suspicious/malicious activity.

Figure 4A:
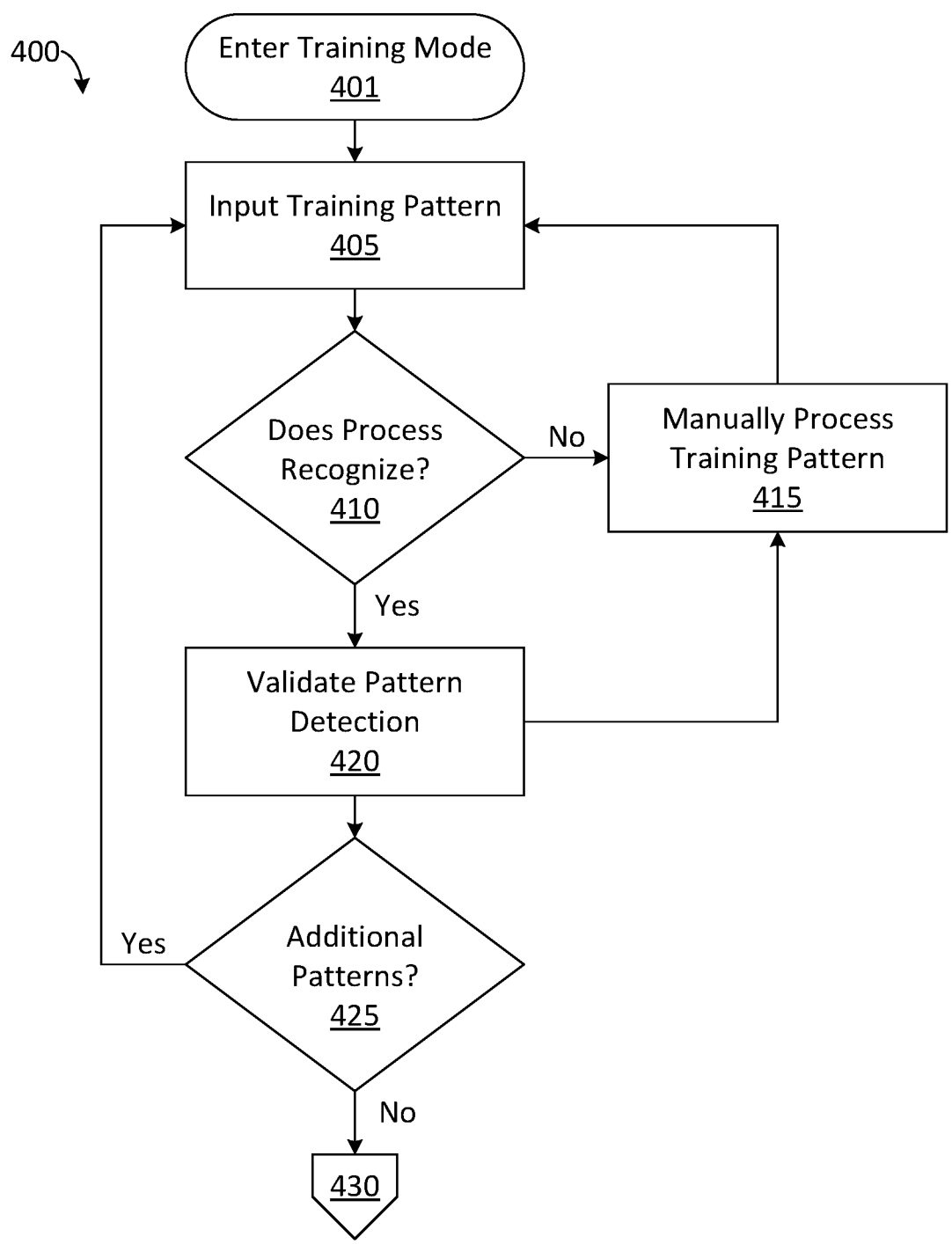
FIG. 4A illustrates an example flow chart of a training process for providing industrial system cybersecurity event detection and corresponding response in accordance with various embodiments of the disclosure.

FIG. 4A illustrates an example flow chart 400 of a training process that may be used with the cybersecurity process 220 for ML algorithm training to provide industrial system cybersecurity event detection and corresponding response in accordance with various embodiments of the disclosure. It should be appreciated that a wide range of industrial systems may utilize embodiments of the present disclosure and it is not limited to those illustrated in any of the enclosed figures. Utilizing a training process prior to, or during operation of an industrial system, has a number of benefits. One such benefit is the time from system commissioning to system operation in a live environment is minimized. As such an industrial system would already include a cybersecurity process that is trained with known cyber vulnerabilities or anomalies, system commissioning may occur immediately after the algorithm training is completed and need not wait for an actual occurrence of suspicious/malicious activity in the field for the algorithm to learn and subsequently act upon a cyber threat.

The flowchart 400 generally begins by the cybersecurity process 220 entering into a training mode at 401, either automatically or manually by an operator. At 405, known sensor data patterns are provided as training patterns into one or more ML algorithms 221 to provoke a response from the ML algorithms. The known sensor data patterns may reflect known vulnerabilities or anomalies, variations of known vulnerabilities or anomalies, as well as anomalous behavior that may not be a vulnerability (i.e., patterns that do not contain a vulnerability and are not anomalous). A library of training patterns (e.g., derived from threat patterns database 223) may be utilized to provide the known sensor data patterns, and this library may be augmented over time to remain current with contemporary vulnerabilities or anomalies. The training patterns may be injected at different points in the industrial system, for example, at the industrial sensor 200a-n, the sensor I/O device 210, and/or directly in the cybersecurity process 220.

One or more injection points may also be used during training to validate the impact of any real-world system effects, such as processing latency, on operation of the industrial system itself. For example, if the training patterns are injected directly into the cybersecurity process 220, this may be one method of determining whether that cybersecurity process is operating as expected. However, if a process point further upstream from the cybersecurity process 200 is chosen, such as the industrial sensors 200a-n themselves, additional validation may take place to further assure an operator that the entire process chain from sensor I/O interface to cybersecurity process to remote environment is operating as expected with the injected training patterns. It should be appreciated these injections need not be digital in nature but may be adjustments of analog sensors made in a manner known to cause a pattern that should be recognized by the cybersecurity process 220.

Examples of sensor data patterns that may be injected include, but are not limited to, data patterns outside the typical operating parameters of a process. As one example, a rapid change in temperature may occur for a thermal mass that does not change regularly. As another example, a rate of communication for a sensor changes where the sensor may report data at a particular rate regularly, but that rate changes dramatically. As yet another example, data is expected from a sensor in a particular sequence, but that sequence is altered or missing.

Once a training pattern is injected (and inputted into the ML algorithm), a determination is made at 410 whether the ML algorithms of the cybersecurity process 220 recognizes the pattern. Alternatively, the determination may be performed by an operator manually examining the output of the ML algorithms. If the ML algorithms do not recognize the training pattern, then the cybersecurity process 220 may provide an operator with the option of manually training (i.e., adjusting) the algorithms based on the training pattern at 415. This helps subsequent runs of the cybersecurity process 220 to better identify the training pattern. Such a manual training may include placing the pattern into the library of training patterns used in the training of the cybersecurity process 220, if the pattern is not already in the library.

If the ML algorithms recognize the training pattern, then the cybersecurity process 220 validates the recognition at 420. This validation may be performed automatically by the cybersecurity process 220 by comparing the output of the ML algorithms to a known or expected output based on the training pattern. Such validation may be performed by the cybersecurity process 220 using the same or similar algorithms that was utilized to recognize the pattern. Alternatively, one or more other algorithms may be utilized to perform the validation of the pattern recognition. An operator may also manually validate the recognition in addition to or in place of the cybersecurity system 220 validation to ensure the validation is valid.

Once the recognition is validated, additional patterns may be injected or re-injected as determined at 425. A training session may include one or many injections of patterns to allow the cybersecurity process 220 to learn what patterns to identify. Additionally, the responses of the industrial control process to such patterns may also be validated at this time, as the live responses of an industrial system to training patterns may not be practical, safe, or in some cases even possible. The training process thus allows for the safe identification and validation of various threat patterns and resulting process operations in a timely fashion, thereby facilitating robust commissioning of the industrial system.

Figure 4B:
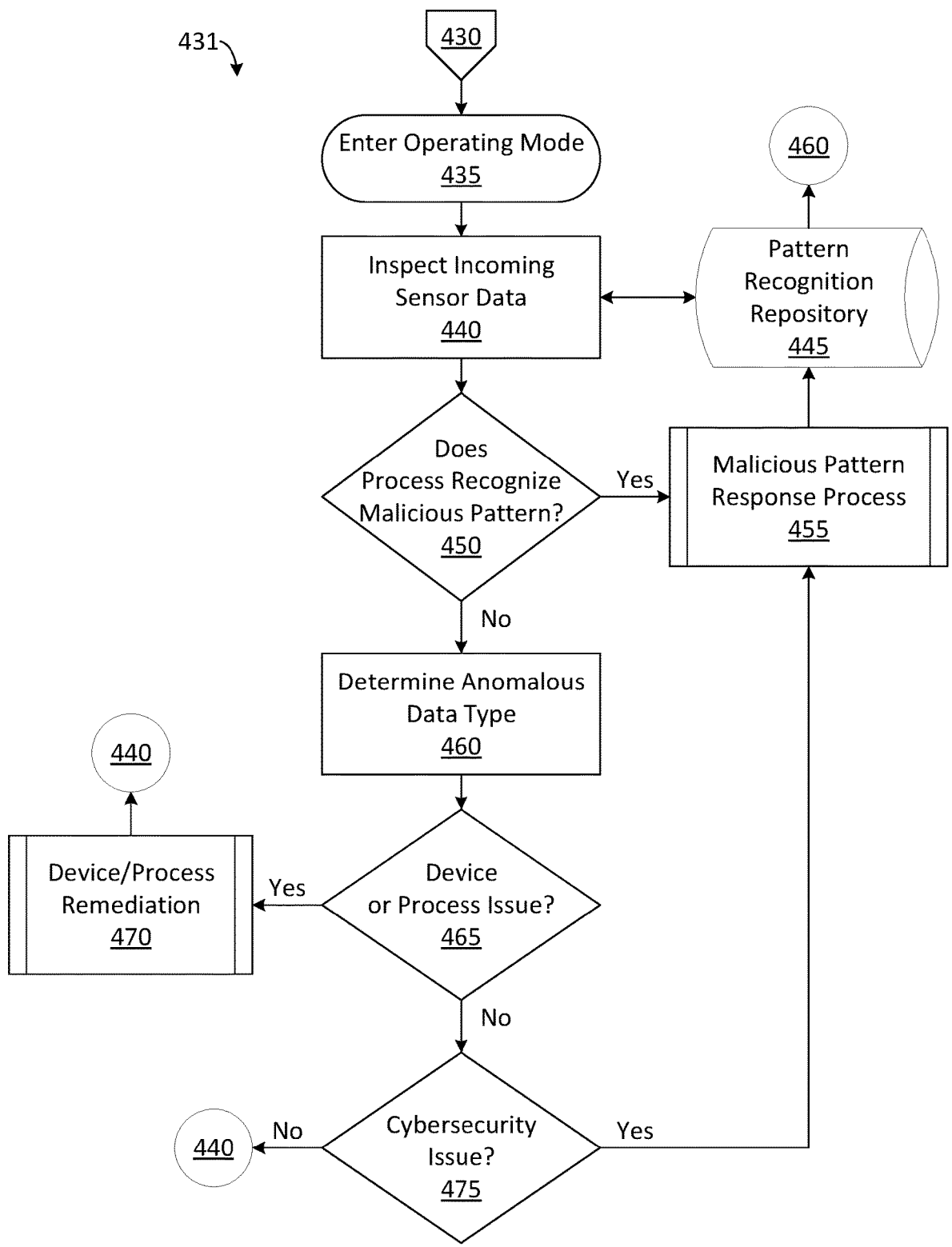
FIG. 4B illustrates an example flow chart of an operating process for providing industrial system cybersecurity event detection and corresponding response in accordance with various embodiments of the disclosure.

Once the training process is complete, the cybersecurity process 220 may automatically transition at 430 to an operating mode, as shown in FIG. 4B. Alternatively, the cybersecurity process 220 may enter the operating mode later if the industrial system is being commissioned at a later time. It should be appreciated that in some cases the training mode may be entered into after the commissioning of the industrial system. As well, if additional patterns need be trained or a relearning of existing patterns is necessary, the cybersecurity process may be retrained as needed. Indeed, training and retraining may be performed on a regularly scheduled basis in some embodiments. As the library of training patterns is periodically updated, periodic retraining may be beneficial to allow the most up-to-date patterns to be recognized. Note that an industrial system need not be taken offline to accomplish this training.

FIG. 4B illustrates an example flow chart 431 of an operating mode for the cybersecurity process 220 in providing industrial system cybersecurity event detection and corresponding response in accordance with various embodiments of the disclosure. The flowchart 431 generally begins by the cybersecurity process 220 entering into the operating mode at 435, either automatically or by an operator. Once the operating mode is entered, sensor data generated by the industrial sensors 200*a-n* is inspected at 440 by the cybersecurity process 220. In some embodiments, the incoming sensor data may be compared to or otherwise processed against threat patterns in a pattern recognition repository at 445 (e.g., derived from threat patterns database 223). This repository may be updated periodically with additional patterns or otherwise augmented to include updated existing patterns in order to remain up to date and comprehensive. Alternatively, the cybersecurity process 220 may process the sensor traffic without specific reference to the pattern recognition repository 445 (i.e., using only the training from FIG. 4A), depending on the particular recognition algorithm used.

A determination is made at 450 whether the cybersecurity process 220 recognizes a potentially suspicious/malicious pattern. If so, the cybersecurity process 220 responds by executing a malicious pattern response process at 455. This malicious pattern response process may include various process control actions that are defined on a per pattern basis (i.e., each pattern provokes a specific response), a set of patterns (i.e., related patterns provoke a specific response), or for all patterns (i.e., all patterns provoke the same response). Control actions in response to a detected potential suspicious/malicious pattern may include, but are not limited to, doing nothing, notifying a set of users, monitoring a particular industrial process for further changes, halting portions of an industrial process, or halting the industrial process completely. In preferred embodiments, actions that alter or halt an industrial process are performed only by an operator due to potentially disastrous consequences for the industrial process, in which case the cybersecurity process 220 merely alerts the operator. It should thus be appreciated that a decision whether to take a control action and which particular action is highly dependent on the pattern recognized and/or the effects on other portions of the industrial process, with an operator performing most control actions in preferred embodiments. Such a malicious pattern response process 455 is intended to be highly configurable to provide maximum flexibility to allow one or more desired control actions based on one or more detected patterns.

If sensor data is not determined to reflect potentially suspicious/malicious activity at 450, then the cybersecurity process 220 determines whether the data may reflect a pattern that is a process anomaly or a device (e.g., sensor) anomaly at 460. This anomaly type determination may be done in some embodiments by comparing the sensor data to patterns in the pattern recognition repository to see if the data may be a variant on an existing pattern that the cybersecurity process 220 has determined to be eventually suspicious/malicious. Such a determination may be based on, for example, matching or correlating the sensor data to a particular portion or percentage of a known suspicious/malicious pattern. Further processing may be performed by the cybersecurity process 220 at this point if there is enough of a match or correlation to raise concerns.

In the above case, the cybersecurity process 220 determines at 465 whether the sensor data reflects a process anomaly or a device anomaly. A process anomaly occurs when the process itself may fall outside of specification, but there are no cybersecurity threats. In that case, the process would still need to be corrected, but the cybersecurity process 220 does not need to execute the malicious pattern response process. Instead, the cybersecurity process 220 would execute a device/process issue process at 470, which may include sending an alert to appropriate personnel and/or taking appropriate control action as needed. Similarly, a device anomaly occurs when one or more industrial devices have failed, but again there are no cybersecurity threats. In that case, maintenance would need to be performed on the device (e.g., sensor), but the cybersecurity process 220 does not need to execute the malicious pattern response process. It should be appreciated that industrial systems may be very complex in nature and processes may fail or drift from their intended specified parameters. Further, devices fail and also drift from their intended specified parameters. In these cases, the cybersecurity process 220 initiates remediation actions rather than cybersecurity actions.

If no device or process anomaly is detected at 465, then the cybersecurity process 220 determines whether the sensor data may raise other cybersecurity issues at 475. These other cybersecurity issues do not rise to the level of a potentially suspicious/malicious activity, but nonetheless the data may warrant a level of further evaluation that may be defined as needed based on a particular implementation. If no such cybersecurity issues are detected, the cybersecurity process 220 continues inspecting incoming sensor data at 440 until otherwise interrupted by a user or by itself. However, if a cybersecurity issue is detected based on further evaluation of the sensor data, the cybersecurity process 220 may execute the malicious pattern response process 455 as described above. This includes comparing the sensor data to any new or augmented patterns that are detected that may be cybersecurity threats or malicious in nature and capturing the sensor data into the pattern recognition repository for potential future use in detection of cybersecurity threats.

In the foregoing discussion, various embodiments of the present disclosure are described as being hosted in a virtual or cloud-computing environment. As well, one or more general-purpose computer systems may be used to implement various embodiments of the present disclosure. Such general-purpose computer systems used in various embodiments of this disclosure may be, for example, any general-purpose computers such as those based on Intel PENTIUM-type processor, Motorola PowerPC, Sun UltraSPARC, Hewlett-Packard PA-RISC processors, or any other type of processor.

Figure 5:
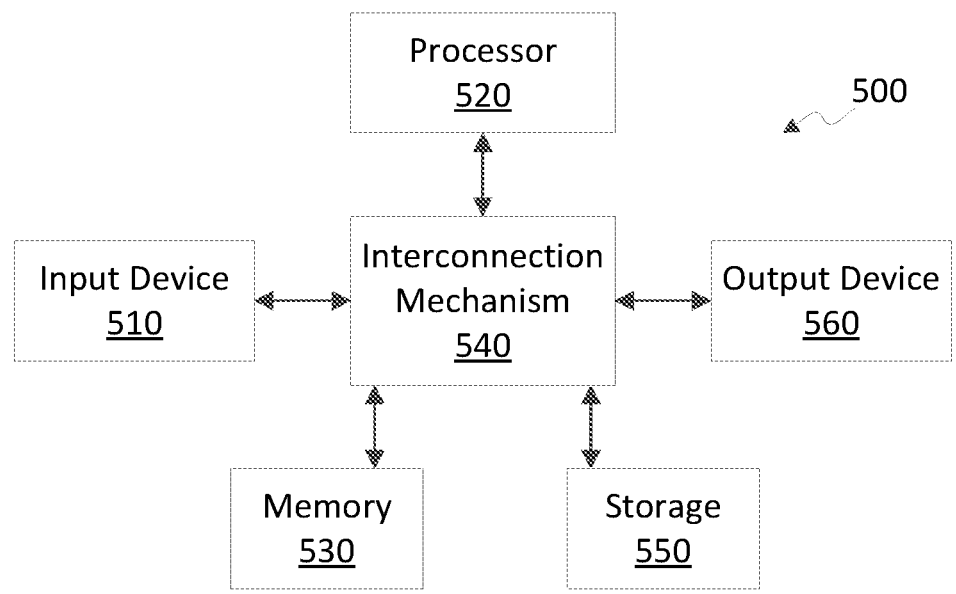
FIG. 5 is a functional block diagram of a general-purpose computer system in accordance with embodiments of this disclosure.

For example, various embodiments of the disclosure may be implemented as specialized software executing in a general-purpose computer system 500 such as that shown in FIG. 5. The computer system 500 may include a processor 520 connected to one or more memory devices 530, such as a disk drive, memory, or other device for storing data. Memory 530 is typically used for storing programs and data during operation of the computer system 500. The computer system 500 may also include a storage system 550 that provides additional storage capacity. Components of computer system 500 may be coupled by an interconnection mechanism 540, which may include one or more busses (e.g., between components that are integrated within the same machine) and/or a network (e.g., between components that reside on separate discrete machines). The interconnection mechanism 540 enables communications (e.g., data, instructions) to be exchanged between system components of system 500.

Computer system 500 also includes one or more input devices 510, for example, a keyboard, mouse, trackball, microphone, touch screen, and one or more output devices 560, for example, a printing device, display screen, speaker. In addition, computer system 500 may contain one or more interfaces (not shown) that connect computer system 500 to a communication network (in addition or as an alternative to the interconnection mechanism 540).

Figure 6:
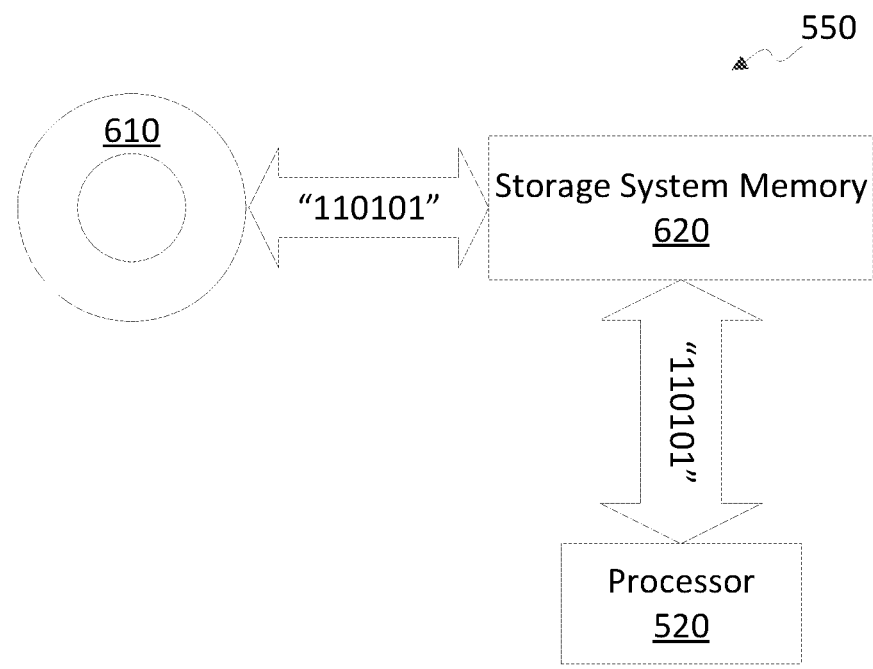
FIG. 6 is a functional block diagram of a general-purpose storage system in accordance with the general-purpose computer system of FIG. 5.

The storage system 550, shown in greater detail in FIG. 6, typically includes a computer readable and writeable nonvolatile recording medium 610 in which signals are stored that define a program to be executed by the processor or information stored on or in the medium 610 to be processed by the program to perform one or more functions associated with embodiments described herein. The medium may, for example, be a disk or flash memory. Typically, in operation, the processor causes data to be read from the nonvolatile recording medium 610 into another memory 620 that allows for faster access to the information by the processor than does the medium 610. This memory 620 is typically a volatile, random access memory such as a Dynamic Random-Access Memory (DRAM) or Static RAM (SRAM). It may be located in storage system 600, as shown, or in memory system 530. The processor 520 generally manipulates the data within the integrated circuit memory 530, 620 and then copies the data to the medium 610 after processing is completed. A variety of mechanisms are known for managing data movement between the medium 610 and the integrated circuit memory element 530, 620, and the disclosure is not limited thereto. The disclosure is not limited to a particular memory system 530 or storage system 550.

The computer system may include specially-programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

Although computer system 500 is shown by way of example as one type of computer system upon which various aspects of the disclosure may be practiced, it should be appreciated that aspects of the disclosure are not limited to being implemented on the computer system as shown in FIG. 6. Various aspects of the disclosure may be practiced on one or more computers having a different architecture or components shown in FIG. 6. Further, where functions or processes of embodiments of the disclosure are described herein (or in the claims) as being performed on a processor or controller, such description is intended to include systems that use more than one processor or controller to perform the functions.

Computer system 500 may be a general-purpose computer system that is programmable using a high-level computer programming language. Computer system 500 may be also implemented using specially programmed, special purpose hardware. In computer system 500, processor 520 is typically a commercially available processor such as the well-known Pentium class processor available from the Intel Corporation. Many other processors are available. Such a processor usually executes an operating system which may be, for example, the Windows 95, Windows 98, Windows NT, Windows 2000, Windows ME, Windows XP, Vista, Windows 7, Windows 10, Windows 365, or progeny operating systems available from the Microsoft Corporation, MAC OS System X, or progeny operating system available from Apple Computer, the Solaris operating system available from Sun Microsystems, UNIX, Linux (any distribution), or progeny operating systems available from various sources. Many other complete or portions of operating systems may be used.

The processor and operating system together define a computer platform for which application programs in high-level programming languages are written. It should be understood that embodiments of the disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java, Python) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, Python, C++, Ada, or C# (C-Sharp). Other object-oriented programming languages may also be used. Alternatively, functional, scripting, and/or logical programming languages may be used, such as BASIC, ForTran, COBoL, TCL, CoreNLP, or Lua. Various aspects of the disclosure may be implemented in a non-programmed environment (e.g., documents created in HTML, XML or other format that, when viewed in a window of a browser program render aspects of a graphical-user interface (GUI) or perform other functions). Various aspects of the disclosure may be implemented as programmed or non-programmed elements, or any combination thereof.

In embodiments of the present disclosure discussed above, results of analyses may be described as being provided in real-time. As understood by those skilled in the art, the use of the term real-time is not meant to suggest that the results are available immediately, but rather, are available quickly giving a designer the ability to try a number of different designs over a short period of time, such as a matter of minutes.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

We claim:

1. A method of providing industrial system cybersecurity event detection and corresponding response, comprising:
   receiving sensor outputs from one or more industrial sensors in the industrial system, the industrial sensors being used to monitor and control an industrial process in the industrial system;
   deriving sensor data from the sensor outputs, the sensor data reflecting one or more industrial processing aspects of the industrial process;
   processing the sensor data using one or more pattern recognition algorithms, the one or more pattern recognition algorithms trained to recognize potentially suspicious/malicious patterns that indicate a potential cyberattack on the industrial system;
   determining whether the one or more pattern recognition algorithms recognize the sensor data as a potentially suspicious/malicious pattern; and
   executing a malicious pattern response process in response to the sensor data being recognized as a potentially suspicious/malicious pattern; and
   injecting training patterns at different injection points in the industrial system during training of the one or more pattern recognition algorithms to validate the one or more pattern recognition algorithms against real-world system effects, including processing latency.

2. The method of claim 1, wherein the malicious pattern response process includes one or more process control actions, the one or more control actions defined on a per pattern basis, a set of patterns basis, or for all patterns.

3. The method of claim 2, wherein the one or more process control actions include doing nothing, notifying a set of users, monitoring one or more aspects of the industrial process for further changes, halting portions of the one or more aspects of the industrial process, or halting the industrial process.

4. The method of claim 3, further comprising storing the sensor data in a pattern recognition repository in response to the sensor data being recognized as a potentially suspicious/malicious pattern.

5. The method of claim 1, further comprising executing a remediation response process in response to the sensor data not being recognized as a potentially suspicious/malicious pattern.

6. The method of claim 1, wherein the one or more pattern recognition algorithms are machine learning algorithms.

7. The method of claim 1, wherein the one or more training patterns injected into the industrial system are stored in a library of training patterns.

8. The method of claim 1, wherein processing the sensor data is performed in a cloud computing environment or locally at the industrial system.

9. The method of claim 1, wherein the one or more industrial sensors include one or more of analog sensors and digital sensors.

10. A system for providing industrial system cybersecurity event detection and corresponding response, comprising:
- a local or virtual processor; and
- a storage device communicatively coupled to the local or virtual processor and storing computer-readable instructions for a cybersecurity process thereon that, when executed by the processor, cause the system to:
- receive sensor outputs from one or more industrial sensors in the industrial system, the industrial sensors being used to monitor and control an industrial process in the industrial system;
- derive sensor data from the sensor outputs, the sensor data reflecting one or more industrial processing aspects of the industrial process;
- process the sensor data using one or more pattern recognition algorithms, the one or more pattern recognition algorithms trained to recognize potentially suspicious/malicious patterns that indicate a potential cyberattack on the industrial system;
- determine whether the one or more pattern recognition algorithms recognize the sensor data as a potentially suspicious/malicious pattern; and
- execute a malicious pattern response process in response to the sensor data being recognized as a potentially suspicious/malicious pattern;
- wherein the one or more pattern recognition algorithms are trained by injecting training patterns at different injection points in the industrial system during training of the one or more pattern recognition algorithms to validate the one or more pattern recognition algorithms against real-world system effects, including processing latency.

11. The system of claim 10, wherein the malicious pattern response process includes one or more process control actions, the one or more control actions defined on a per pattern basis, a set of patterns basis, or for all patterns.

12. The system of claim 11, wherein the one or more process control actions include doing nothing, notifying a set of users, monitoring one or more aspects of the industrial process for further changes, halting portions of the one or more aspects of the industrial process, or halting the industrial process.

13. The system of claim 12, wherein the computer-readable instructions further cause the system to store the sensor data in a pattern recognition repository in response to the sensor data being recognized as a potentially suspicious/malicious pattern.

14. The system of claim 10, wherein the computer-readable instructions further cause the system to execute a remediation response process in response to the sensor data not being recognized as a potentially suspicious/malicious pattern.

15. The system of claim 10, wherein the one or more pattern recognition algorithms are machine learning algorithms.

16. The system of claim 10, wherein the one or more training patterns injected into the industrial system are stored in a library of training patterns.

17. The system of claim 10, wherein the one or more industrial sensors include one or more of analog sensors and digital sensors.

18. A non-transitory computer-readable medium storing computer-readable instruction for a cybersecurity process thereon that, when executed by a processor, causes the processor to:
- receive sensor outputs from one or more industrial sensors in the industrial system, the industrial sensors being used to monitor and control an industrial process in the industrial system;
- derive sensor data from the sensor outputs, the sensor data reflecting one or more industrial processing aspects of the industrial process;
- process the sensor data using one or more pattern recognition algorithms, the one or more pattern recognition algorithms trained to recognize potentially suspicious/malicious patterns that indicate a potential cyberattack on the industrial system;
- determine whether the one or more pattern recognition algorithms recognize the sensor data as a potentially suspicious/malicious pattern; and
- execute a malicious pattern response process in response to the sensor data being recognized as a potentially suspicious/malicious pattern;
- wherein the one or more pattern recognition algorithms are trained by injecting training patterns at different injection points in the industrial system during training of the one or more pattern recognition algorithms to validate the one or more pattern recognition algorithms against real-world system effects, including processing latency.

* * * * *